United States Patent
Ferslew et al.

(10) Patent No.: US 9,322,275 B2
(45) Date of Patent: Apr. 26, 2016

(54) SELF LOCKING NUT AND BOLT ASSEMBLY

(75) Inventors: Matthew Ryan Ferslew, Greenville, SC (US); Roger Clayton Walker, Greenville, SC (US); John Herbert Dimmick, III, Greenville, SC (US)

(73) Assignee: General Electric Company, Schenectady, NY (US)

(*) Notice: Subject to any disclaimer, the term of this patent is extended or adjusted under 35 U.S.C. 154(b) by 369 days.

(21) Appl. No.: 13/195,875

(22) Filed: Aug. 2, 2011

(65) Prior Publication Data

US 2013/0034402 A1 Feb. 7, 2013

(51) Int. Cl.
| | | |
|---|---|---|
| *F01D 5/00* | (2006.01) | |
| *F16B 39/12* | (2006.01) | |
| *F01D 5/06* | (2006.01) | |
| *F16B 39/02* | (2006.01) | |

(52) U.S. Cl.
CPC ............ *F01D 5/066* (2013.01); *F16B 39/025* (2013.01); *F16B 39/12* (2013.01)

(58) Field of Classification Search
CPC ........ F01D 5/066; F16B 39/02; F16B 39/025; F16B 39/026; F16B 39/103; F16B 39/106; F16B 33/00; F16B 33/002; F16B 37/00; F16B 39/023; F16B 39/12

USPC ......... 411/103, 107, 272, 273, 368, 432, 433, 411/223–225, 237–242, 166
See application file for complete search history.

(56) References Cited

U.S. PATENT DOCUMENTS

| | | | | |
|---|---|---|---|---|
| 578,194 | A * | 3/1897 | Bauser ................. | F16B 39/12 |
| | | | | 411/222 |
| 632,422 | A * | 9/1899 | McLaughlin ............. | 411/237 |
| 783,572 | A * | 2/1905 | Gibbs .................... | 411/249 |
| 972,968 | A * | 10/1910 | Wismer ................. | 411/272 |
| 1,196,565 | A * | 8/1916 | McDonald ............. | F16B 35/06 |
| | | | | 411/184 |
| 1,235,205 | A * | 7/1917 | Kierstead ............... | 411/221 |
| 1,352,918 | A * | 9/1920 | Rohbock ................ | 411/392 |
| 1,400,154 | A * | 12/1921 | Green ..................... | F16B 39/28 |
| | | | | 411/233 |

(Continued)

OTHER PUBLICATIONS

Crowson, Richard (2006). Handbook of Manufacturing Engineering, 4 Volume Set (2nd Edition). Taylor & Francis. p. 141.*

(Continued)

*Primary Examiner* — Flemming Saether
(74) *Attorney, Agent, or Firm* — Sutherland Asbill & Brennan LLP

(57) ABSTRACT

The present application provides a self locking nut and bolt assembly for a stack of rotating wheels. The self locking nut and bolt assembly may include a tie bolt extending through the stack of rotating wheels, a locking nut positioned on a first end of the tie bolt, and a locking washer positioned on the one end of the tie bolt within the locking nut.

20 Claims, 2 Drawing Sheets

(56) References Cited

U.S. PATENT DOCUMENTS

| | | | | |
|---|---|---|---|---|
| 1,470,528 | A | * | 10/1923 | Flentjen ............... 411/237 |
| 1,717,789 | A | * | 6/1929 | Larrad ................. 411/237 |
| 1,779,896 | A | * | 10/1930 | Winter ................. 411/272 |
| 4,035,901 | A | * | 7/1977 | Lux et al. .............. 29/243.5 |
| 4,260,005 | A | * | 4/1981 | Stencel ................. 411/3 |
| 5,004,389 | A | | 4/1991 | Spinger et al. |
| 5,020,953 | A | * | 6/1991 | Wada ................... 411/247 |
| 5,090,854 | A | | 2/1992 | Hafeli et al. |
| 5,226,788 | A | | 7/1993 | Fledderjohn |
| 5,796,202 | A | | 8/1998 | Herron et al. |
| 5,860,779 | A | * | 1/1999 | Toosky et al. ........... 411/432 |
| 6,220,804 | B1 | | 4/2001 | Pamer et al. |
| 6,784,597 | B1 | | 8/2004 | Hess et al. |
| 7,431,560 | B2 | * | 10/2008 | Sterner ................. F01D 17/165 415/160 |
| 7,437,976 | B1 | * | 10/2008 | Goldbaum ............... 81/121.1 |
| 7,614,317 | B2 | * | 11/2009 | Sickert ................. B62D 3/123 29/525.12 |
| 2004/0197160 | A1 | * | 10/2004 | Junkers ................. 411/368 |
| 2007/0201965 | A1 | * | 8/2007 | Littlewood .............. 411/46 |

OTHER PUBLICATIONS

US 5,592,406, 12/1996, Ambrico, et al. (withdrawn).

* cited by examiner

SELF LOCKING NUT AND BOLT ASSEMBLY

TECHNICAL FIELD

The present application relates generally to gas turbine engines and more particularly relates to a self locking nut and bolt assembly for use with a compressor rotor or other type of rotary machine.

BACKGROUND OF THE INVENTION

The rotors of rotary machines, such as turbines and compressors, generally include a number of axially stacked wheels. A number of circumferentially spaced blades are mounted in turn about the periphery of the wheels for rotation therewith. For example, compressor rotors generally include a series of individual compressor wheels stacked together with a set of tie bolts extending axially therethrough. The wheels mount the rotor blades thereon to form the compressor stages with a corresponding number of stator blades. The tie bolts typically are elongated studs that may be threaded at both ends. The tie bolts are enclosed by nuts to maintain the wheels in a stacked, assembled relationship relative to one another. A sufficient load is applied to the tie bolts to ensure that the rotor torque is carried through the stack by friction between the wheels.

It will be appreciated that any loosening of the nuts on the tie bolts would reduce the tension on the bolts and, thus, lower the torque carrying capability of the rotor. Current rotor designs thus require that the rotation of the nut relative to the bolt be prevented by redundant methods. One such method relies on friction against the threads and the stack. A second method uses a jam nut against a primary nut to prevent rotation relative to the stud. A further method uses a crimped or oblong nut barrel to increase the torque required for removal.

There thus a desire for an improved nut and bolt assembly for use with a compressor rotor and other types of rotary machines. Such an improved nut and bolt assembly preferably would be self locking, would prevent gross rotation of the bolt without adding unnecessary weight or requiring damage to expensive assembly components and the like, and would be readily accessible for inspection and disassembly.

SUMMARY OF THE INVENTION

The present application and the resultant patent thus provide a self locking nut and bolt assembly for a stack of rotating wheels. The self locking nut and bolt assembly may include a tie bolt extending through the stack of rotating wheels, a locking nut on a first end of the tie bolt, and a locking washer positioned on the one end of the tie bolt within the locking nut.

The present application and the resultant patent further provide a method of preventing rotation of a tie bolt in a stack of rotating wheels. The method may include the steps of positioning a locking nut on a first end of the tie bolt, locking the locking nut in place within a bore of one of the rotating wheels, positioning a locking washer on the tie bolt and within the locking nut, and staking the locking washer in place to prevent rotation of the bolt.

The present application and the resultant patent further provide a self locking nut and bolt assembly for a stack of rotating compressor wheels. The self locking nut and bolt assembly may include a tie bolt with bolt threads thereon extending through the stack of rotating wheels, a locking nut positioned on a front end of the tie bolt, and a locking washer positioned on the front end of the tie bolt within the locking nut. The locking nut may include nut threads sized to accommodate the bolt threads and the locking washer may include washer threads sized to accommodate the bolt threads therein.

These and other features of the present application and the resultant patent will become apparent to one of ordinary skill in the art upon review of the following detailed description when taken in conjunction with the several drawings and the appended claims.

DETAILED DESCRIPTION

Figure 1:
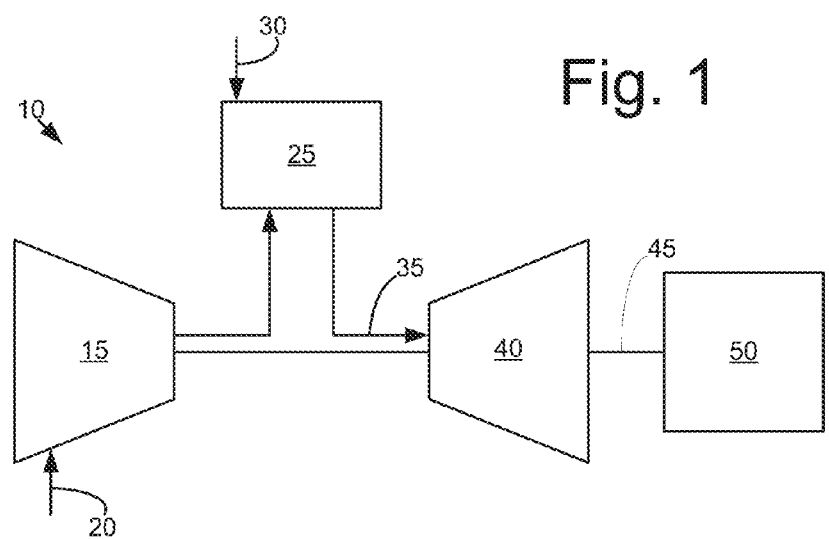
FIG. 1 is a schematic view of a gas turbine engine.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a compressed flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
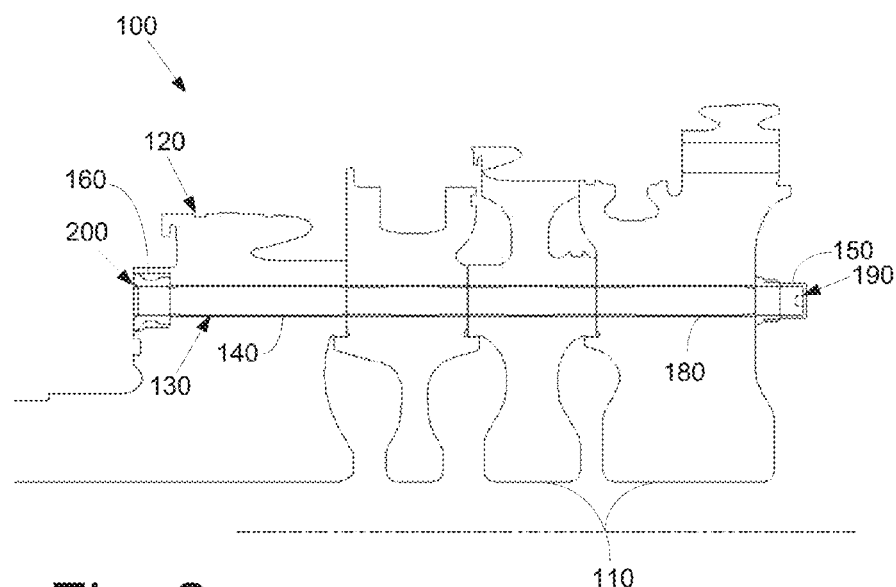
FIG. 2 is a schematic view of a stacked wheel assembly for a rotary machine with a self locking nut and bolt assembly as may be described herein.

FIG. 2 shows a portion of a rotary machine, in this case a compressor 100. The compressor 100 may be similar to the compressor 15 described above. As such, the compressor 100 includes a number of wheels 110. The wheels 110 may be arranged in a stack 120. The wheels 110 and the stack 120 may be maintained in an axial configuration by a number of tie bolt assemblies 130. The tie bolt assemblies 130 extend axially along the length of the compressor stack 120 or a number of tie bolt assemblies 130 may be used for a number of stages therein. Each tie bolt assembly 130 includes a tie bolt 140. The tie bolt 140 may be an elongated stud with an aft end 150 and a forward end 160. Each tie bolt 140 may have a number of bolt threads 170 thereon. The bolt threads 170 may extend along the length of the tie bolt 140 or just about the aft end 150 and/or the forward end 160. The tie bolt 140 extends through a bore 180 in each wheel 110 of the stack 120.

The aft end 150 of each tie bolt 140 may be secured via an aft nut assembly 190. In this example, the aft nut assembly 190 may include a conventional twelve point nut that is forcibly abutted by a jam nut with a crimp. Many other types of aft nut assemblies 190 may be used herein. Other components and other configurations may be used herein.

Figure 3:
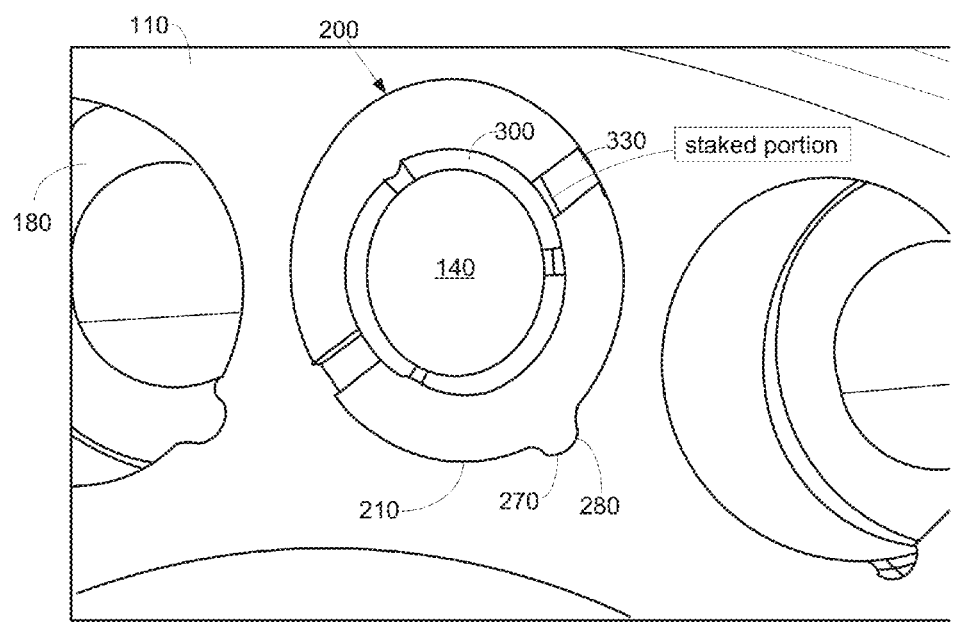
FIG. 3 is a perspective view of the self locking nut and bolt assembly of FIG. 2 positioned in a forward wheel of a wheel stack.
Figure 4:
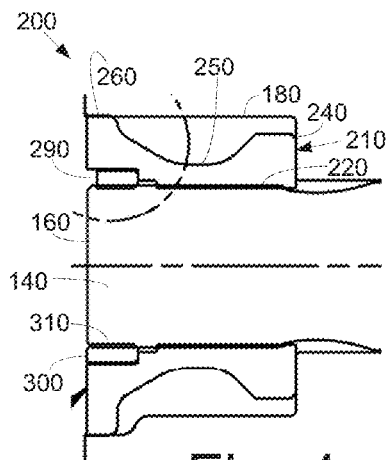
FIG. 4 is a side cross-sectional view of the self locking nut and bolt assembly of FIG. 2.
Figure 5:
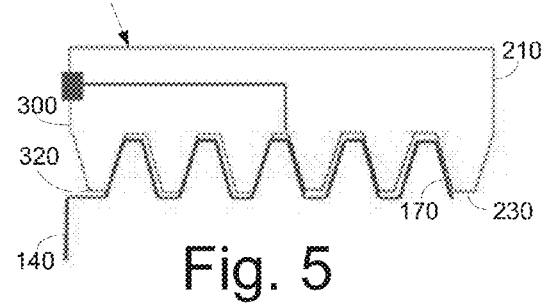
FIG. 5 is a side cross-sectional view of the respective threads of the bolt, the nut, and the locking washer of the self locking nut and bolt assembly of FIG. 2.

FIGS. 3-5 show a self locking nut and bolt assembly 200 as may be described herein. The self locking nut and bolt assembly 200 may secure the tie bolt 140 about the forward end 160 thereof within the bore 180 of the wheel 110 at the front of the stack 120. Multiple self locking nut and bolt assemblies 200 may be used herein together.

The self locking nut and bolt assembly 200 includes a locking nut 210. The locking nut 210 and the components thereof are sized to fit securely within the bore 180 of the wheel 110. The locking nut 210 may include an interior bore 220 with nut threads 230 therein. The nut threads 230 mate with the bolt threads 170 of the tie bolt 140. The locking nut 210 also may include an aft flange 240, a reduced diameter center portion 250, and a forward flange 260. The forward flange 260 may include one or more tabs 270 extending radially outward. The tab 270 may be sized so as to mate with a cut out or notch 280 within the wheel 110 about the bore 180. Any number of tabs 270 and notches 280 may be used herein. The engagement of the tab 270 and the notch 280 prevents rotation of the locking nut 210.

Examples of the configuration and the use of the locking nut 210 are shown in commonly owned U.S. Pat. No. 6,784, 597. The locking nut 210 may be made out of a super alloy such as an nickel-chromium based super alloy including an Inconel material and similar types of materials. Other components and other configurations may be used herein.

In this example, the locking nut 210 includes a cutout 290 about the internal bore 220 adjacent to the forward flange 260. The self locking nut and bolt assembly 200 thus includes a locking washer 300 positioned within the cutout 290. The locking washer 300 may include an internal washer bore 310 with a number of washer threads 320 positioned thereon. The washer threads 320 are sized to engage with the bolt threads 170 of the tie bolt 140. The locking washer 300 may be constructed from a fairly malleable material to aid the staking process as will be described in more detail below. Other components and other configurations may be used herein.

In use, the forward end 160 of the tie bolt 140 may be secured to the locking nut 210. The locking nut 210 is locked in place about the bore 180 of the wheel 110 via the tab 270 and notch 280. Once the tie bolt 140 is tensioned to its full load, the locking washer 300 may be tightened thereon. Tightening the locking washer 300 against the locking nut 210 stretches the bolt 140 and generates a normal force on the locking washer 300 so as to create a compression force to prevent relative rotation.

The locking washer 300 then may be staked into place. The forward flange 260 of the locking nut 210 may have one or more staking slots 330 formed therein so as to accommodate a staking tool without damage to the other components. Staking the locking washer 300 into place ensures that it cannot rotate about the end of the tie bolt 140. Because the threads 170 of the tie bolt 140 are pulled in opposite directions, neither the locking nut 210 nor the locking washer 300 can turn relative to the other such that the tie bolt 140 is locked and unable to rotate. The self locking nut and bolt assembly 200 thus prevents rotation of the tie bolt 140. The staking of the locking washer 300 into the locking nut 210 ensures that the compression load remains constant through out the operation of the gas turbine.

The self locking nut and bolt assembly 200 thus fully locks the tie bolt 140, the locking nut 210, and the locking washer 300 in a simple and compact design. Moreover, no staking damage to the locking nut 210, the tie bolt 140, or the wheel 110 should result given that only the locking washer 300 is staked, Because the locking washer 300 is not a critical clamping component, it can be made of a lower strength material than the nuts and bolts so as to make it less expensive to replace.

The self locking nut and bolt assembly 200 may be inspected during routine maintenance so as to ensure proper bolting loads are maintained. The self locking nut and bolt assembly 200 may include a low profile design for relatively tight space constraints. Moreover, the self locking nut and bolt assembly 200 also may be relatively lightweight so as to reduce bending stresses in the threads and undercuts. The self locking nut and bolt assembly 200 also may be easy to assemble without requiring complex or single purpose tools.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A self locking nut and bolt assembly for coupling a stack of rotating wheels, the assembly comprising:
    a tie bolt configured to extend through the stack of rotating wheels, the tie bolt comprising bolt threads thereon;
    a locking nut positioned on a first end of the tie bolt, the locking nut comprising nut threads engaging the bolt threads; and
    a locking washer positioned on the first end of the tie bolt and within the locking nut, the locking washer comprising washer threads engaging the bolt threads;
    wherein the locking washer and the locking nut pull the bolt threads in opposite directions to lock rotation of the tie bolt relative to the locking washer and the locking nut; and
    wherein a portion of the locking washer is staked into one or more staking slots of the locking nut to lock rotation of the locking washer relative to the locking nut.

2. The self locking nut and bolt assembly of claim 1, wherein the locking nut and the locking washer share the bolt threads and are forcibly abutted against one another to pull the bolt threads in opposite directions.

3. The self locking nut and bolt assembly of claim 1, wherein the first end of the tie bolt comprises a forward end of the tie bolt.

4. The self locking nut and bolt assembly of claim 1, wherein the locking nut comprises a forward flange extending about a forward end of the locking nut.

5. The self locking nut and bolt assembly of claim 4, wherein the forward flange comprises a tab extending radially outward and configured to engage a notch defined in a forward wheel of the stack of rotating wheels to lock rotation of the tab.

6. The self locking nut and bolt assembly of claim 1, further comprising an aft nut assembly positioned on a second end of the tie bolt.

7. The self locking nut and bolt assembly of claim 1, wherein the one or more staking slots extend in a radial manner along a forward end of the locking nut.

8. The self locking nut and bolt assembly of claim 1, wherein the locking nut comprises a bore surrounding the tie bolt.

9. The self locking nut and bolt assembly of claim 1, wherein the locking nut comprises a cut out receiving the locking washer.

10. The self locking nut and bolt assembly of claim 1, wherein the locking washer comprises a washer bore surrounding the tie bolt.

11. The self locking nut and bolt assembly of claim 1, wherein the locking nut comprises a super alloy material.

12. The self locking nut and bolt assembly of claim 1, wherein the locking washer comprises a malleable material for staking.

13. The self locking nut and bolt assembly of claim 1, wherein the locking washer comprises a first material, wherein the locking nut comprises a second material, and wherein the first material has a greater malleability than the second material to facilitate staking.

14. A compressor assembly for a gas turbine engine, the assembly comprising:
   a stack of rotating compressor wheels;
   a tie bolt extending through the stack of rotating compressor wheels;
   the tie bolt comprising bolt threads thereon;
   a locking nut positioned on a front end of the tie bolt;
   the locking nut comprising nut threads engaging the bolt threads; and
   a locking washer positioned on the front end of the tie bolt and within the locking nut;
   the locking washer comprising washer threads engaging the bolt threads;
   wherein the locking washer and the locking nut pull the bolt threads in opposite directions to lock rotation of the tie bolt relative to the locking washer and the locking nut; and
   wherein a portion of the locking washer is staked into one or more staking slots of the locking nut to lock rotation of the locking washer relative to the locking nut.

15. The compressor assembly of claim 14, wherein the locking nut and the locking washer share the bolt threads and are forcibly abutted against one another to pull the bolt threads in opposite directions.

16. The compressor assembly of claim 14, wherein the locking nut comprises a forward flange extending about a forward end of the locking nut.

17. The compressor assembly of claim 16, wherein the forward flange comprises a tab extending radially outward, and wherein a forward wheel of the stack of rotating compressor wheels comprises a notch receiving the tab to lock rotation of the locking nut.

18. The compressor assembly of claim 14, wherein the one or more staking slots extend in a radial manner along a forward end of the locking nut.

19. The compressor assembly of claim 14, wherein a forward wheel of the stack of rotating compressor wheels comprises a wheel bore, and wherein the locking nut is received within the wheel bore.

20. The compressor assembly of claim 14, wherein the locking washer comprises a first material, wherein the locking nut comprises a second material, and wherein the first material has a greater malleability than the second material to facilitate staking.

* * * * *